United States Patent [19]

Takahashi et al.

[11] Patent Number: 4,922,546
[45] Date of Patent: May 1, 1990

[54] RADIO AUDIO/FACSIMILE COMMUNICATION DEVICE

[75] Inventors: Shuichi Takahashi; Kunihiro Yamanaka; Masanao Horiki, all of Sagamihara, Japan

[73] Assignees: Ricoh Company, Ltd., Tokyo; Marantz Japan, Inc., Sagamihara, both of Japan

[21] Appl. No.: 251,922

[22] Filed: Oct. 3, 1988

Related U.S. Application Data

[63] Continuation of Ser. No. 64,694, Jun. 22, 1987, abandoned.

[30] Foreign Application Priority Data

Jun. 20, 1986 [JP] Japan ................................. 61-144203
Aug. 20, 1986 [JP] Japan ................................. 61-192879

[51] Int. Cl.⁵ .......................... H04B 1/40; H04N 1/32
[52] U.S. Cl. ..................................... 455/74; 455/344; 379/100; 358/434
[58] Field of Search ....................... 455/58, 39, 73, 74, 455/345, 78-80, 344; 379/100; 340/825.51; 358/286, 256, 257

[56] References Cited

U.S. PATENT DOCUMENTS

| 3,586,778 | 6/1971 | Riethmeier et al. | 379/100 |
| 4,055,729 | 10/1977 | Vandling | 379/100 |
| 4,551,854 | 11/1985 | Rutty et al. | 455/58 |
| 4,578,537 | 3/1986 | Faggin et al. | 379/100 |
| 4,716,576 | 12/1987 | Sakai et al. | 455/79 |
| 4,809,297 | 2/1989 | Polansky et al. | 455/73 |

FOREIGN PATENT DOCUMENTS

2160072 12/1985 United Kingdom ................ 379/100

OTHER PUBLICATIONS

"Communications for Air Defense Systems", Trill et al., 6/76, all.

*Primary Examiner*—Reinhard J. Eisenzopf
*Assistant Examiner*—Curtis Kuntz
*Attorney, Agent, or Firm*—Oblon, Spivak, McClelland, Maier & Neustadt

[57] ABSTRACT

A radio facsimile interface unit is connected between a radio set provided with a speaker and a facsimile machine and also connected to a microphone stand provided with a microphone and a manually operable transmission switch. The interface unit is so structured to allow the radio set to carry out an ordinary audio communication using the speaker and the microphone. The radio set is normally set in a reception mode and the transmission switch is depressed only when audio information is to be transmitted. The interface unit is provided with a relay between the microphone and the radio set and the relay is disconnected when the facsimile is in a transmission mode, so that facsimile communication is given a higher priority than audio communication.

9 Claims, 4 Drawing Sheets

4,922,546

RADIO AUDIO/FACSIMILE COMMUNICATION DEVICE

This is a continuation of application Ser. No. 064,694 filed on June 22, 1987, now abandoned.

BACKGROUND OF THE INVENTION

1. Field of the Invention

This invention generally relates to a radio communication device for use in audio and data communication, such as facsimile communication, selectively, and, in particular, to a radio audio/facsimile communication device in which radio facsimile communication has a higher priority than radio audio communication.

2. Description of the Prior Art

Radio communication devices, such as radio facsimiles and radiotelephones, using radio waves for communication are well known in the art. However, these prior art radio communication devices are separate devices so that two separate sets of a radio facsimile and a radiotelephone must be provided if it is desired to transmit not only image information, but also audio information. It is thus preferable if there is a radio communication device commonly usable for audio and facsimile communications.

SUMMARY OF THE INVENTION

In accordance with the principle of the present invention, there is provided a radio communication device which is commonly usable for audio and data (facsimile) communications. In the preferred embodiment, there is provided a radio communication interface device which is connected between a radio set and a data communication device, such as a facsimile machine, and which is also connected to a microphone. The interface device is so structured that facsimile communication has higher priority than audio communication. Thus, while facsimile communication is in progress, access by audio communication is prohibited.

It is therefore a primary object of the present invention to provide an improved radio communication device capable of using for audio and data communications selectively.

Another object of the present invention is to provide an improved radio facsimile interface unit which allows to use a commercially available radio set without change.

A further object of the present invention is to provide a radio audio/facsimile communication device having a higher priority for facsimile communication.

A still further object of the present invention is to provide a radio/facsimile communication device simple and easy to operate.

Other objects, advantages and novel features of the present invention will become apparent from the following detailed description of the invention when considered in conjunction with the accompanying drawings.

DESCRIPTION OF THE PREFERRED EMBODIMENTS

Figure 1:
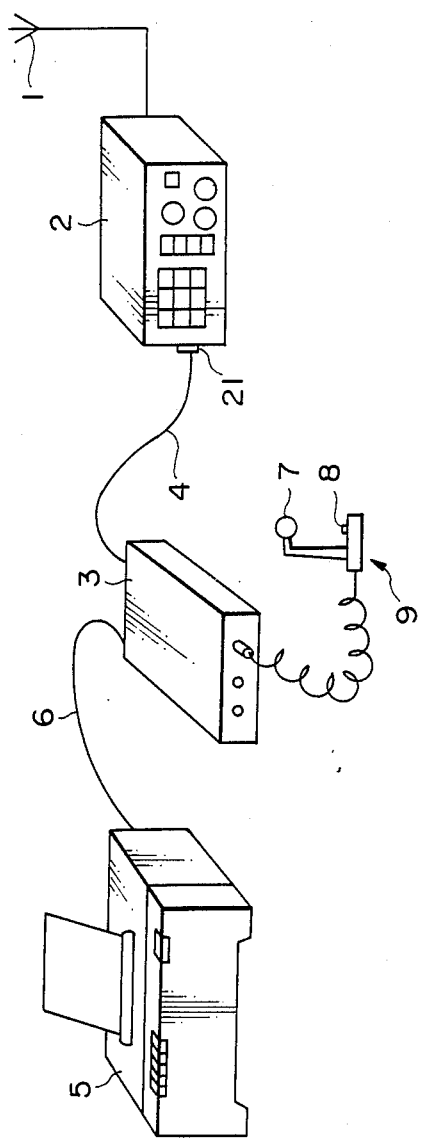
FIG. 1 is a schematic illustration showing the overall structure of a radio audio/facsimile communication device constructed in accordance with one embodiment of the present invention.

Referring now to FIG. 1, there is schematically shown a radio audio/facsimile communication device constructed in accordance with one embodiment of the present invention. A radio set 2 having an antenna 1 is connected to an interface unit 3 via an interconnection cord 4 and the interface unit 3 is connected to a facsimile machine 5 via an interconnection cord 6. Also provided is a microphone stand 9 which includes a microphone 7 and a transmission switch 8 in the form of a press-button switch and which is connected to the interface unit 3. The radio set 2 can be any commercially available radio set and thus it has a microphone jack 21 to which a standard microphone stand, such as the one shown as 9 in FIG. 1, may be connected when the radio set 2 is to be used solely for audio communication. As well known in the art, the microphone jack 21 includes input and output terminals for inputting and outputting voice signals for audio communication and an input-/output switching terminal. When the microphone stand 9 is directly connected to the microphone jack 21 of the radio set 2, the radio set 2 is normally set in the receiving mode so that audio information received by the antenna 1 is converted into voice or sound by a speaker (not shown) provided in the radio set 2. With the depression of the transmission switch 8, the radio set 2 is set in the transmission mode so that voice or sound input into the microphone 7 is transmitted in the form of radio waves from the antenna 1. In this manner, the radio set 2 can be used as either a receiver or a transmitter by changing the mode of operation by the transmission switch 8.

Figure 2:
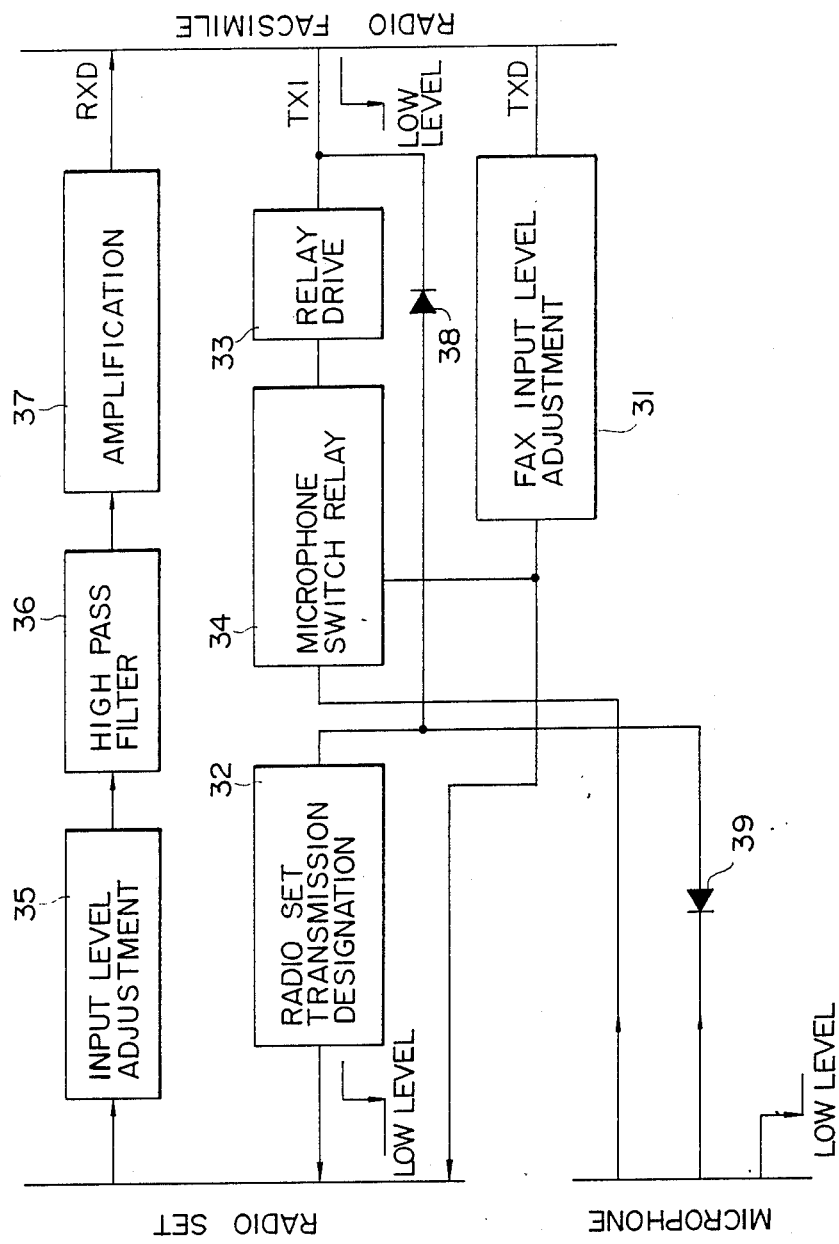
FIG. 2 is a schematic illustration showing partly in blocks the detailed structure of one embodiment of the radio facsimile interface unit 3 provided in the device of FIG. 1.

In the structure shown in FIG. 1, the microphone stand 9 is not directly connected to the radio set 2, though such a direct connection can be made, if desired. On the other hand, the microphone stand 9 is connected to the radio set 2 via the interface unit 3 embodying the present invention. One embodiment of the interface unit 3 is schematically shown in FIG. 2. As shown in FIG. 2, the interface unit 3 includes three lines extending between the radio set 2 and the facsimile machine 5, i.e., (1) a transmission data line TXD, (2) a reception data line RXD, and (3) a transmission designation line TXI. The transmission data line TXD extends between a transmission data output terminal of the radio facsimile 5 and an audio signal input terminal of the radio set 2 and includes a facsimile input level adjusting circuit 31 inbetween. An output terminal of the facsimile input level adjusting circuit 31 is connected to a microphone switch relay 34, which, in turn, is connected to the microphone 7, so that an audio signal from the microphone 7 may be supplied to the facsimile input level adjusting circuit 31 via a break contact of the microphone switch relay 34.

On the other hand, the reception data line RXD extends from an audio signal output terminal of the radio set 2 to a reception data input terminal of the radio facsimile 5 and includes an input level adjusting circuit 35, a high pass filter 36 and an amplifier 37 in the order mentioned inbetween. In addition, the transmission designation line TXI includes a radio set transmission designating circuit 32 which has its output terminal connected to the input/output switching terminal of the radio set 2 and which is also connected to the microphone stand 9, so that the radio set 2 may be set in the transmission mode by depression of the transmission switch 8 of the microphone stand 9 via the radio set transmission designating circuit 32. In the illustrated embodiment, the radio set transmission designating circuit 32 outputs a low level radio set transmission designation signal in response to a low level input signal supplied thereto. In the structure of FIG. 2, diodes 38 and 39 are provided as connected as shown for preventing the flow of reversed current. In addition, the transmission designation line TXI includes a relay drive circuit 33 at the side of the radio facsimile 5, and the relay drive circuit 33 is connected to the microphone switch relay 34 to control the operation thereof. That is, in response to a transmission designation signal from the radio facsimile 5, the break contact of the microphone switch relay 34 is disconnected so that there is established a condition in which audio communication is prohibited while allowing facsimile communication. With such a structure, facsimile communication is given a higher priority than audio communication.

In operation, transmission data from the radio facsimile 5 is adjusted to a predetermined level by the facsimile input level adjusting circuit 31 and then supplied to the radio set 2 for transmission in the form of radio waves from the antenna 1. In this instance, in response to a transmission designation signal from the radio facsimile 5, the radio set transmission designation circuit 32 is activated so that the radio set transmission designating circuit 32 causes the radio set 2 to be set in the transmission mode. And, at the same time, the radio transmission designating circuit 32 causes the relay drive circuit 33 to be activated, so that the relay drive circuit 33 causes the microphone switch relay 34 to be disconnected, thereby giving priority to facsimile communication opposed to audio communication.

Then, when radio waves of facsimile communication are received by the radio set 2 via its antenna 1, an image signal thus received is adjusted in level by the input level adjusting circuit 35 and then the level-adjusted image signal is passed through the high pass filter 36, amplified by the amplifier 37 and then supplied to the radio facsimile 5.

On the other hand, in the case of audio communication, when radio waves of an audio signal are received by the radio set 2 via the antenna 1, the audio information is converted into voice or sound by the speaker provided in the radio set. In order to transmit audio information, the operator pushes the transmission switch 8 to set the radio set 2 in the transmission mode, so that any voice or sound produced by the operator may be transmitted in the form of radio waves from the antenna 1.

Figure 3:
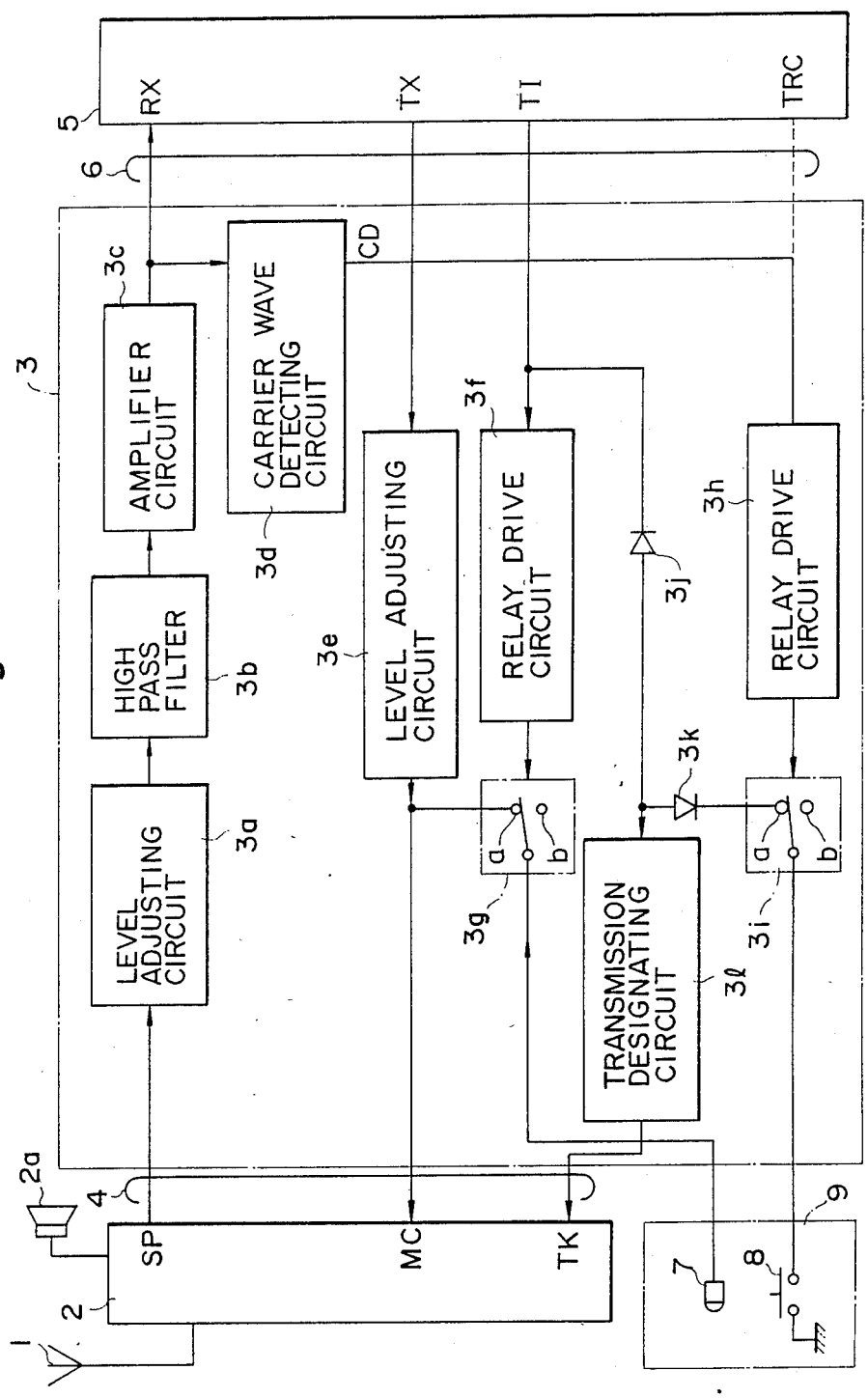
FIG. 3 is a schematic illustration showing partly in blocks the detailed structure of another embodiment of the radio facsimile interface unit 3 provided in the device of FIG. 1.

FIG. 3 shows another embodiment of the interface unit 3 suitable for use in a radio audio/facsimile communication device as shown in FIG. 1. As shown in FIG. 3, the facsimile machine 5 includes a data reception terminal RX for receiving a reception data signal, a data transmission terminal TX for transmitting a transmission data signal, and a transmission designation terminal TI for outputting a signal indicating the transmission mode. These data reception and transmission signals are modulated in accordance with a predetermined modulating scheme and fall within an audio frequency range.

The interface unit 3 includes a level adjusting circuit 3a, which receives an audio signal supplied from an audio output terminal SP of the radio set 2 and adjusts the audio signal thus received to a predetermined level, a high pass filter 3b, which eliminates noise components, and an amplifier 3c which amplifies the audio signal and supplies the thus amplified audio signal to a reception terminal RX of the facsimile machine 5. Also provided in the interface unit 3 is a carrier wave detecting circuit 3d which detects the carrier wave component of the audio signal supplied from the amplifier 3c to the facsimile machine 5. The interface unit 3 also includes a level adjusting circuit 3e which receives an output signal from the transmission terminal TX of the facsimile machine 5 and supplies the signal to a microphone terminal MC of the radio set 2 after adjusting the level of the signal to a predetermined level. A relay drive circuit 3f is also provided for receiving a transmission designation signal from the transmission designation terminal TI of the facsimile machine 5 and drives a relay 3g. Another relay drive circuit 3h is provided to drive another relay 3i in accordance with the result of detection by the carrier wave detecting circuit 3d.

Also provided are diodes 3j and 3k as connected as shown, and these diodes define an OR gate for driving a transmission designating circuit 3l by either one of two signals. The transmission designating circuit 3l has its output terminal connected to a transmission designating terminal TK of the radio set 2.

With the above-described structure, in the stand-by mode, in which the facsimile machine 5 is neither transmitting nor receiving data, the output signal from the transmission designating terminal TI is high and the output signal from the transmission terminal TX is off. Under this condition, the relay drive circuit 3f causes the relay 3g to maintain connection with its upper contact a as shown, so that the microphone 7 is connected to the microphone terminal MC of the radio set 2 via the relay 3g. In addition, the relay drive circuit 3h causes the relay 3i to establish connection with its upper contact a as shown, so that the transmission switch 8 is connected to the transmission designating circuit 3l via the relay 3i and the diode 3k.

When the transmission switch 8 is depressed under this condition, the input terminal of the transmission designating circuit 3l is connected to ground via the diode 3k, relay 3i and switch 8. As a result, the transmission designating circuit 3l turns on a transmission designating signal to be supplied to the transmission designating terminal TK. This transmission designating signal is a control signal which causes the radio set 2 to be set in the reception mode when it is in the off state and in the transmission mode when it is in the on state. Thus, when the operator is speaking against the microphone 7 while keeping the transmission switch 8 depressed, the speech is transmitted in the form of radio waves from the antenna 1 of the radio set 2. On the other hand, when the transmission switch 8 is undepressed and restored to its normal position, the radio set 2 is set in the reception mode, and, thus, audio information received via the antenna 1 is output from a speaker 2a provided in the radio set 2. In this manner, while the facsimile machine 5 remains unused, radio communication can be carried out in a conventional manner through the interface unit 3.

Figure 4:
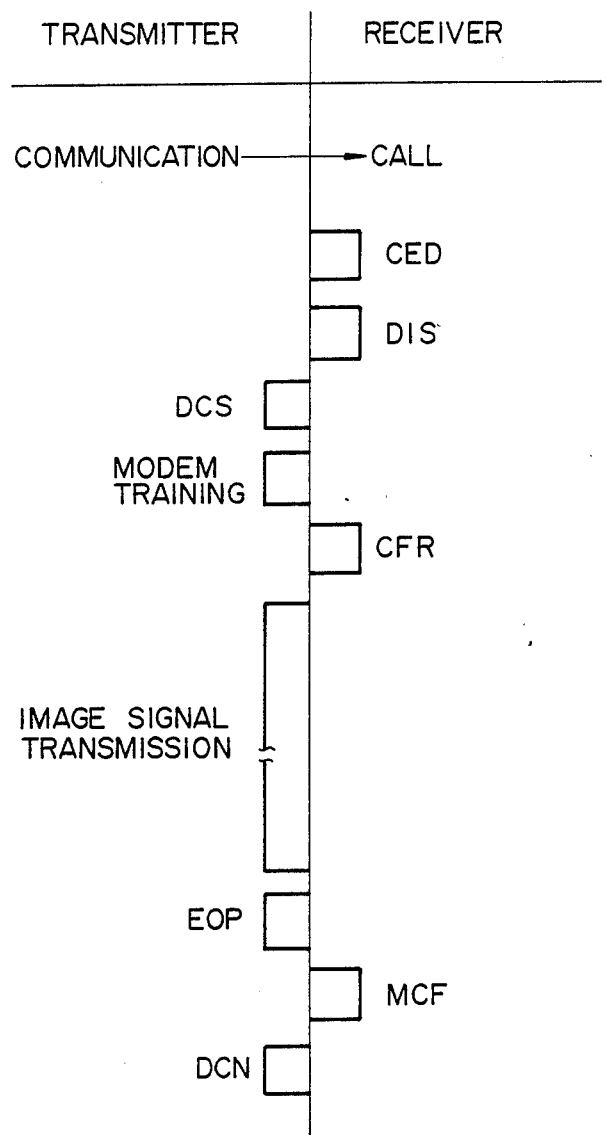
FIG. 4 is a schematic illustration showing a facsimile communication procedure which can be implemented by the device of FIG. 1.

Now, the facsimile communication mode in the structure shown in FIG. 3 will be described with particular reference to one example of a facsimile communication procedure illustrated in FIG. 4. Upon receipt of a call signal from a remote transmitter, this call signal is played by the speaker 2a so that the operator can recognize that the remote transmitter is requesting facsimile communication. Accordingly, the operator pushes a reception button (not shown) of the facsimile machine 5. Then, following the procedure illustrated in FIG. 4, the facsimile machine 5 outputs a CED signal and then a DIS signal from its transmission terminal TX. And, at the same time, a low level signal is output from the transmission designating terminal TI. The level adjusting circuit 3e receives the CED and DIS signals and supplies them to the microphone terminal MC of the radio set 2 after having been adjusted to a predetermined level. On the other hand, the low level signal supplied from the transmission designating terminal TI is supplied to the transmission designating circuit 3l via the diode 3j. Upon receipt of this low level signal, the transmission designating circuit 3l turns on the transmission designating signal to be supplied to the transmission designating terminal TK. Thus, the CED and DIS signals are transmitted to the remote transmitting station in sequence.

Under the condition, the relay drive circuit 3f receives a low level output signal supplied from the transmission designating terminal TI and causes the relay 3g to be switched to its lower contact b. For this reason, the microphone 7 is now disconnected at the relay 3g, thereby preventing any audio information supplied from the microphone 7 from being transmitted.

On the other hand, the remote transmitting station, upon receipt of these CED and DIS signals, now transmits a DCS signal and a MODEM training signal. The radio set 2 receives these signals and output from the audio output terminal SP, so that these signals are adjusted in level by the level adjusting circuit 3a. Thereafter, the low frequency noise components of these signals are eliminated by the high pass filter 3b, and the signals are amplified by the amplifier circuit 3c and supplied to the reception terminal RX of the facsimile machine 5, which, in turn, carries out a predetermined communication control operation upon receipt of these signals.

The carrier wave detecting circuit 3d monitors the singal output from the amplifier circuit 3c, and when the carrier wave detecting circuit 3d detects a carrier wave of communication signal, i.e., any facsimile signal, it turns on a carrier detection signal CD. Upon turning on of this carrier detection signal CD, the relay drive circuit 3h switches the relay 3i to establish connection with its lower contact b. With this, the transmission switch 8 is disconnected at the realy 3i and thus isolated from the interface unit 3, so that the operation of the transmission switch 8 is rendered invalid. Thus, even if the transmission switch 8 is inadvertently operated while reception of facsimile information is in progress, the radio set 2 is prevented from being set in the transmission mode undesirably. Thereafter, the facsimile machine 5 carries out an ordinary facsimile communication operation in a manner well known in the art and as shown in FIG. 4. As described before, during reception of facsimile information, the operation of the transmission switch 8 is rendered invalid, and, on the other hand, during transmission of facsimile information, audio information supplied from the microphone 7 is prevented from being transmitted.

Upon completion of the above-mentioned facsimile communication, the carrier detection signal CD is turned off and the output signal from the transmission designating terminal TI is rendered high, thereby establishing the condition in which audio communication can be carried out freely in a conventional manner.

As described above, in the present embodiment, the radio set 2 can be any commercially available radio set for audio communication and it is used for both audio and facsimile communications selectively. In addition, the interface unit 3 is so structured that, during reception of facsimile information, the operation of the transmission switch 8 is inhibited, and, on the other hand, during transmission of facsimile information, audio information from the microphone 7 is prevented from being transmitted and cancelled. With this structure, the switching between the audio communication mode and the facsimile communication mode can be effected simply by operating the transmission switch 8 only when audio information is desired to be transmitted, which is simple and extremely easy for the operator. In addition, the operation of the transmission switch 8 does not cause any interference with facsimile communication.

In the above-described embodiment, use has been made of the carrier wave detecting circuit 3d for detecting the data receiving condition. Alternatively, a detecting circuit for detecting the data receiving condition may be provided in the interior of the facsimile machine 5, whereby the signal indicating the data receiving condition is output from the terminal TRC and supplied to the relay drive circuit 3h. In addition, in the above-described embodiment, a facsimile machine has been provided as a data communication device which is connected with a radio set via the interface unit 3 of the present invention. However, as such a data communication device, use may be made of any other devices, such as a computer, a printer, a scanner, or the like in place of the facsimile machine. Such a data communication device should be provided with a transmission designating terminal TI for outputting a low level signal while the data communication device is transmitting data.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A radio facsimile interface unit connectable between a radio set and a facsimile machine and having both audio and facsimile communication modes, comprising:

first adjusting means for adjusting a level of a signal when it is supplied from said radio set to said facsimile machine;

second adjusting means for adjusting a level of a signal when it is supplied from said facsimile machine to said radio set;

mode designating means for designating a mode of operation of said interface unit in response to a mode designation signal supplied thereto exteriorily of said interface unit;

supplying means for supplying an audio signal from a microphone to said radio set when audio information is applied to said microphone by an operator;

inhibiting means coupled to said mode designating means for temporarily inhibiting the operation of said supplying means in response to said mode designating signal when said mode designating signal designates said facsimile communication mode; and means for providing said second adjusted level signal to said radio set and for providing said first adjusted level signal to said facsimile machine.

2. The interface unit of claim 1, wherein said mode designating signal is supplied either from said facsimile machine when said facsimile machine operates in said facsimile communication mode or from an external switch provided exteriorily of and operatively coupled to said interface unit.

3. The interface unit of claim 2, wherein said supplying means includes a switch which is normally closed but which is set open in response to said mode designating signal.

4. The interface unit of claim 1, wherein said mode designating signal has either high or low state, and said mode designating signal is normally set at a preselected one of these two states and set to the other state when said interface unit is to be set in said facsimile communication mode.

5. The interface unit of claim 1, wherein said radio set has a microphone jack through which said interface unit is connected to said radio set.

6. The interface unit of claim 1, wherein said radio set includes a speaker for outputting audio information received by said radio set.

7. A data communication interface unit connectable between a radio set and a data communication device and having both audio and data communication modes, comprising:

first level adjusting means for adjusting a level of a signal when it is supplied from said radio set to said data communication device and for selectively supplying said signal;

second level adjusting means for adjusting a level of a signal when it is supplied from said data communication device to said radio set and for selectively supplying said signal;

a microphone connected to said radio set through a first switch which is normally closed;

mode designating means for designating a mode of operation of said interface unit, said mode designating means designating said interface unit to be in said data communication mode if a data communication mode designating signal is supplied thereto either from a manually operable designating switch through a second switch which is normally closed or from said data communication device;

first disconnecting means for disconnecting said first switch if said data communication mode designating signal is supplied from said data communication device;

detecting means connected to said first level adjusting means for detecting when a data signal is selectively supplied from said radio set to said data communication device; and second disconnecting means for disconnecting said second switch in response to a detection signal supplied from said detecting means.

8. The interface unit of claim 7, wherein said data communication device is a facsimile machine.

9. The interface unit of claim 7, wherein said data communication mode designating signal has either a high or low state and said radio set is set in a transmission mode by said mode designating means when said data communication mode signal is set in a low state.

* * * * *